Oct. 23, 1928.
A. E. GIBSON
1,688,490
MACHINE FOR APPLYING SOLDER TO PINS
Filed Sept. 24, 1924 2 Sheets-Sheet 1
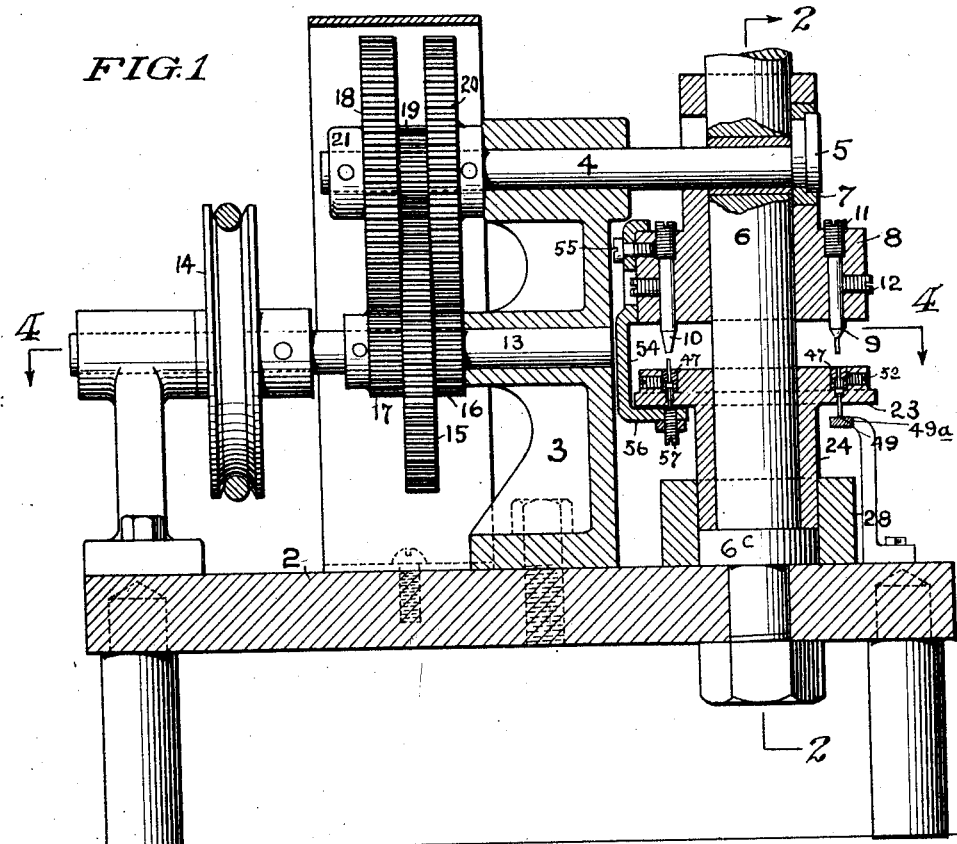
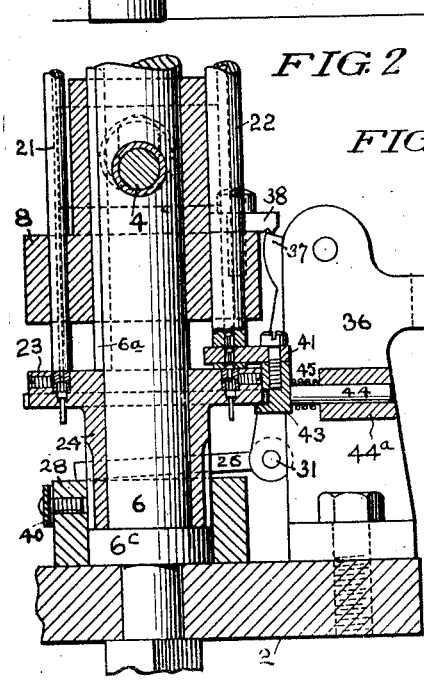
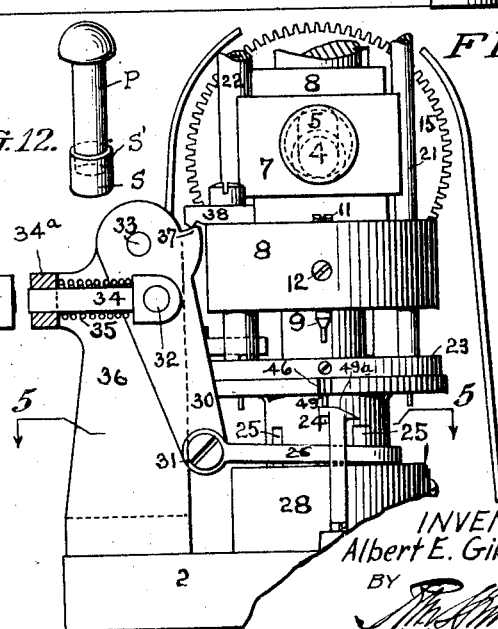
INVENTOR
Albert E. Gibson;
BY
ATTORNEY.

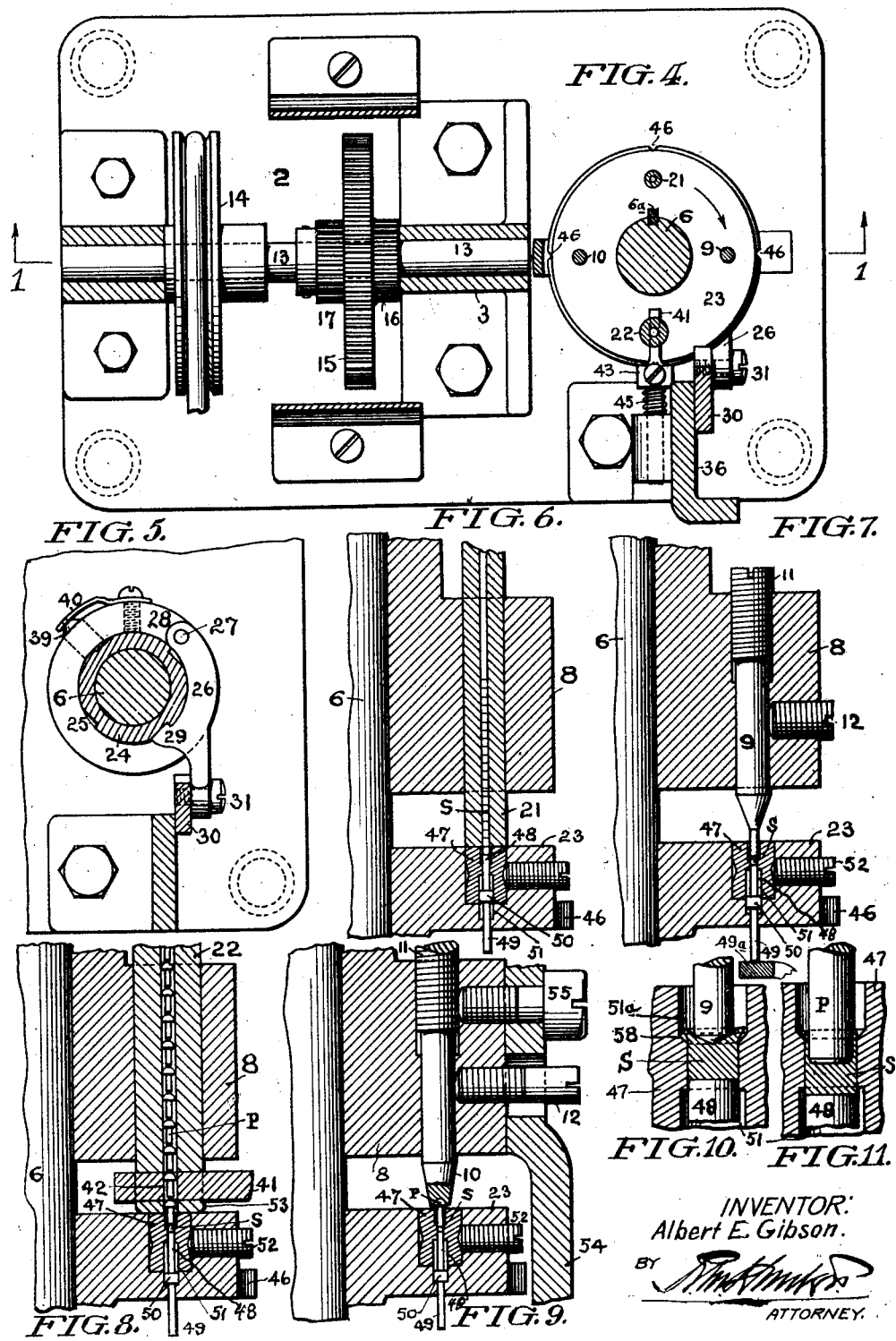

Patented Oct. 23, 1928.

1,688,490

UNITED STATES PATENT OFFICE.

ALBERT E. GIBSON, OF SPRINGFIELD, PENNSYLVANIA, ASSIGNOR TO THE DENTISTS' SUPPLY COMPANY, A CORPORATION OF NEW YORK.

MACHINE FOR APPLYING SOLDER TO PINS.

Application filed September 24, 1924. Serial No. 739,574.

My invention has for its object the attachment of solder to the ends of pins employed in the manufacture of artificial teeth wherein the pins are soldered to anchoring means embedded in the porcelain of the tooth, the benefits to be derived from the present invention being the reduction in labor and cost in assembling the pins and solder in the anchors before being subjected to a solder fusing temperature which insures the union of the pins and anchors.

The customary practice in the manufacture of artificial teeth is to first insert small cylinders of solder dipped in a suitable flux solution and thereafter insert the shank of a headed pin, allowing it to rest upon the solder. Upon fusing the solder, the pin settles down into the anchor and becomes soldered thereto. Objection to this method of procedure arises from the fact that two distinct operations with small tweezers must be had, one for first handling the solder particles and the other for handling the pins; and further, that as the solder particles are quite small and rounded, it is not easy to select and pick them up and therefore the operation involves considerable time of the operator which is chargeable against the cost of production. A further objection is that as the pins loosely rest on the solder they are not always in upright position and hence upon fusing the solder they sometimes become attached to the anchors in an objectionably inclined position. These objections are wholly overcome by providing solder attached to the ends of the pins as a preliminary product, so that when picking up the pin, the operator also picks up the attached solder; and when the pin with the attached solder is inserted in the hole and anchor, it is held in an upright position by reason of the solder fitting the anchor more closely than the pin itself would fit the porcelain hole as heretofore.

My invention, therefore, consists in a machine for attaching solder to the ends of pins as a preliminary product to be used in the manufacture of artificial teeth, the same comprising mechanism for mechanically operating upon pins and solder to cause them to be mechanically connected in pairs whereby they may be handled as a unit, the invention embodied in said mechanism being fully described hereinafter and more particularly pointed out in the claims.

Referring to the drawings: Fig. 1 is a vertical sectional view of a machine embodying my invention, taken on line 1—1 of Fig. 4; Fig. 2 is a vertical section of the same taken on line 2—2 of Fig. 1; Fig. 3 is a front view of the main portion of the machine with portions broken away; Fig. 4 is a horizontal sectional view of my improved machine taken on line 4—4 of Fig. 1; Fig. 5 is a horizontal sectional view of the same taken on line 5—5 of Fig. 3; Fig. 6 is a vertical section of the same showing the means for feeding the solder down into the die; Fig. 7 is a vertical section of the same showing the solder being shaped in the dies; Fig. 8 is a vertical sectional view of the same showing the means for feeding the pins down upon the solder; Fig. 9 is a vertical sectional view of the same showing the means for forcing the pin down into the prepared solder for mechanically uniting them; Fig. 10 is an enlarged vertical sectional view showing the preliminary shaping of the solder by the dies, as in Fig. 7; Fig. 11 is an enlarged vertical sectional view showing the pin end mechanically attached to the solder by the means as in Fig. 9; and Fig. 12 is a perspective view showing the pin with the solder attached as a finished product of the machine.

The table or main frame of the machine is indicated at 2 and may be of any suitable construction. 3 is an upright frame secured to the table and having bearings for shafts 4 and 13, the former for operating the dies and plungers and the latter for the driving gearing. An upright guide post 6 is also bolted to the table and lies in the same vertical plane as the shaft 4 which is also journaled in its upper end as shown in Fig. 1. A vertically reciprocable head 8 is guided upon the upright post 6 and is held against rotation thereon by a spline 6ᵃ. The upper portion of the head 8 is provided with a transverse slide 7 and in which is journaled an eccentric 5 on the end of the shaft 4, as shown in Figs. 1 and 3. By these means the rotation of shaft 4 causes a reciprocation of the head 8. The shaft 4 receives motion from belt pulley 14 through shaft 13 and speed reducing gearing as follows. To shaft 13 is secured a pinion 17 which drives a larger gear 18 loosely journaled on shaft 4 and held in place by a hub 21 secured to said shaft. Secured to gear 18 is a pinion 19 which meshes with and drives a large gear 15 having secured to it a pinion 16. These gears 15 and 16 rotate as a unit and are idlers loosely journaled on drive shaft 13. The pinion 16 meshes with a larger gear 20 which is secured tightly to and drives shaft 4. By these means the head 8 is reciprocated at a moderate speed from the rapidly rotated pulley and whereby greater power may be exerted than would be directly available from the primary source of power (not shown).

The reciprocating head 8 is provided with a die plunger 9 and a hammer 10 whose longitudinal positions on the head are adjusted by thrust screws 11. Set screws 12 are provided for locking these parts 9 and 10 in their adjusted position. As shown, the die plunger 9 and hammer 10 are arranged upon diametrically opposite sides of the head 8 and intermediate of them circumferentially considered are two stationary magazine tubular guides 21 and 22, the former for feeding short cylindrical or cartridge lengths of solder S and the latter for feeding pins P end to end to the lower female dies 47 arranged on the turret 23.

The turret 23 is journaled upon the stud 6 and comprises a disc having a hub 24 providing an extended bearing surface. This turret is held against downward thrust by resting upon an annular collar $6^c$ of the post 6. The turret is prevented from rising by the lower end of the spline $6^a$ and the guide tubes 21 and 22 which extend down close to the upper surface thereof. The axial lines of all of the parts 9 10, 21 and 22 have the same radial distance from the center of the post 6 and similarly all of the female dies 47 arranged in the turret have their axial centers equidistant radially from the center of the post and this radial distance is identical with the radial distance of the parts 9, 10, 21 and 22, aforesaid. Moreover the female dies 47 are four in number and are arranged at 90° apart and similarly the die plunger 9, the hammer 10, and the magazine tubular guides 21 and 22 for the solder and pins are also arranged at 90° apart; and therefore, it will be apparent that the die parts 47 on the turret are adapted for interchangeable alinement and coaction with each of the other parts 9, 10, 21 and 22, when the turret is intermittently rotated. In this manner, a solder cylinder or cartridge S is fed from solder guide tube 21 into one of the female dies 47 (Fig. 6), just about filling its upper part $51^a$ and is thereafter moved under die plunger 9 (Figs. 7 and 10), where it is somewhat shaped to receive the pin; it is then moved under the pin guide 22 to receive a pin P (Fig. 8), and finally is moved under the hammer 10 by which the pin is driven down to finish shaping the solder by flanging the same about the end of the pin shank (Figs. 9 and 11). It will also be understood that this same series of operations are simultaneously going on with each of the four female dies 47 of the turret, though these four kinds of actions are at any moment distributed over the four dies 47. This means that during normal operation, for every reciprocation of the head 8, a complete pin with solder attached is discharged, though as a matter of fact, to actually complete the union, four reciprocations of the head is necessary.

Referring more particularly to the dies employed: The die plunger 9 is provided with an end which enters the female die and spreads the upper end of the solder into more or less a mushroom formation (Fig. 10), it being understood that the solder cartridge or cylinder S tightly fits the waist or narrowest diameter of the said female die and thereby assisted by the stationary cam part $49^a$ resists downward movement during the mushrooming of the same. The female die 47 fits a bored recess in the upper part of the turret and is clamped therein by clamping screw 52. It is counter-bored above at $51^a$ to a diameter slightly greater than the waist diameter and also enlarged at the bottom at 51. The bottom of the upper counter-bore $51^a$ constitutes an annular inclined shoulder 58. The anvil die member 48 has a downwardly extending stem 49 passing through and below the turret and also has a collar 50 sliding within the lower counter-bore 51 and confining the downward limits of movement of the anvil die member as a whole. This collar 50 sustains the anvil die 48 in its lowermost position. In Fig. 7, the anvil member 48 is shown as not fully down but before securing the results indicated in Fig. 11, it will be depressed to the lowermost position, as shown in Figs. 8 and 9, whereat the anvil die receives the downward thrust on the solder.

When the pin P has been forced down into mechanical union with the solder cartridge S, as shown in Figs. 9 and 11, it will be necessary to reverse the movements of the anvil die to eject the pin with attached solder and this is accomplished by the ejector arm 54 fastened by screw 55 to the reciprocating head 8, said arm having an inward end 56 below the anvil die 48 and fitted with an adjustable lifting screw 57 by which the die may be forced upward to the desired extent when ejecting the connected pin and solder (Fig. 12) and assuming the position indicated in Fig. 1. The upward movement of the head and ejector 56 has twice the upward movement necessary to operate the anvil die and consequently it is only on the last or rising quarter of each reciprocation which causes the anvil die to be fully lifted for ejecting the pin with attached solder. As the turret is given another 90° rotation the ejector is lowered allowing the anvil die 48 to drop down in the female die 47 sufficiently to permit it to pass under the magazine tube 21 and to receive another solder cartridge. Thereafter the operations explained are repeated.

In the case of feeding the pins P from magazine tube 22 into the female die 47 beneath it (Fig. 8), the head of the pin must remain extended above the turret surface to permit the pin to be driven by hammer 10 down into the solder S as in Figs. 9 and 11. These pins P are fed downward through the magazine tube which extends down to the upper surface of the turret head. The lower end of the magazine tube 22 is slotted transversely and fitted with a reciprocable cut-off 41 which is provided with a vertical aperture 42 of the same diameter as the hole in magazine tube and adapted to be brought intermittently in alinement therewith, as when feeding a pin downward into the female die 47 located below the tube (Fig. 8). The height of this cut-off 41 is the same as the total length of the pins and hence shifts the pin bodily with itself when cutting off the feeding action. This cut-off 41 receives its motion by being connected with a head 43 having a horizontal rod 44 sliding in a guide 44ª on the bracket 36 and in which a coil spring 45, surrounding the rod, normally forces the head toward the perimeter of the turret. The turret 8 is provided on its perimeter, at 90° apart, with V notches 46 into which a V or knive edge on the head 43 enters (Fig. 4), to permit of a slight end movement to the cut-off 41. This cut-off action takes place with each 90° movement of the turret, there being four V notches, respectively, in radial alinement with each female die 47. The turret and notches 46 thereof act as cam devices for reciprocating the cut-off 41 in times relation to the movements of the turret and its dies. By these means a single pin is fed at a time into the die and all the rest are held in the magazine and the feeding of the pins is automatically done under control by the movements of the turret. The under part of the magazine tube 22 is slotted at 53 transversely to the direction of the movements of the cut-off, so that the projecting head end of the pin P may be moved from under the tube, as the turret revolves, to transfer the pin to a position under the hammer 10 (Fig. 9).

Heretofore, I have referred to the turret being given intermittent rotary movements of 90° each, and I will now describe the means for accomplishing these movements. Referring to Figs. 2, 3 and 5, the hub 24 of the turret has its perimeter provided with four equally spaced notches 25 of ratchet form (Fig. 5). Surrounding this hub and centered upon the collar 6° is a sleeve 28, which is provided with a detent 39 inwardly spring pressed by spring 40, so as to engage the ratchet grooves 25 of the turret hub. The sleeve 28 is given a rotary oscillation by a link 26 having one end hinged to the sleeve at 27 and having its other end jointed at 31 to a pivoted lever 32. This lever 32 is fulcrumed or pivoted to the bracket 36 at 33 and has a heel or short arm 37 which is depressed by the lug 38 secured to the reciprocating head 8 aforesaid. To keep the lug 38 and heel 37 of lever 32 in contact, I provide a rod 34 hinged at one end to the lever and having the other end guided through a hole in lug 34ª on the bracket 36, said rod surrounded by a coil spring 35 operating to continually maintain the lever in operative relation with the lug of head 8. It will now be understood that the spring normally causes the lever 32, link 26 and sleeve 28 to assume the relative positions shown in the drawings when the head 8 is in its upper position. The rotary movement is given to the turret while the head 8 is rising and hence the motive power for providing the rotary movement is the spring 35. When the head 8 is descending the turret must be held stationary and this is accomplished by the spring actuated head 43 engaging the V notches in the turret, as before explained. The link 26 is curved to hug the perimeter of the turret hub 24 and has a locking lug 29 which enters the grooves 25 of the hub in succession to lock the turret against spinning on the completion of a propelling movement induced by the action of the sleeve 28 and detent 39. This provides a positive brake action under the influence of the spring 35, and becomes effective at the moment the locking action takes place through the spring actuated head 43 as above described and the die 9 and hammer 10 are directly in line with the turret dies 47. The downward movement of the head 8 has no effect on this feeding means other than to put the spring 35 under compression simultaneously with the bringing of the link and sleeve into initial feeding positions.

In the use of my improved machine, the pins and solder cartridges are made in separate machines and supplied to the magazine tubes 22 and 21 in any suitable manner (not shown). As such magazine charging and feeding means are well known, there will be need of no description thereof here, more especially as these improvements have to do only with the direct mechanical connection of these articles in pairs, as shown in Fig. 12.

As illustrated, both in Figs. 11 and 12, the solder S has been pressed or "drawn" into cup shape with the annular upward flange S' tightly clamped to the lower end of the pin shank, when the pin driven down by the hammer 10 has been caused to act as a male plunger die to the female die 47, producing at that time a frictional union between the pin and solder which is not disturbed thereafter.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. In a machine of the character stated, the combination of a reciprocating head, with a turret rotatable in a plane at right angles to the direction of reciprocation of the head, a plurality of female dies carried by the turret, a male plunger die and a hammer secured to and movable with the head and spaced at a greater distance apart than the dies on the turret, and magazine feeding means independent of the turret and spaced circumferentially to the turret intermediate of the plunger and hammer dies for feeding different articles to be united respectively to the female dies on the turret when adjusted to positions intermediate of the plunger die and hammer of the reciprocating head, and wherein further, the female dies are spaced 90° apart on the turret and at the same radial distance thereon, the plunger die and hammer are spaced 180° apart relatively to the axis of the turret, and the magazine feeding means comprise separate feeding tubes spaced 180° apart and respectively alternate with the plunger die and hammer.

2. The invention according to claim 1, wherein also, the magazine feeding means includes a relatively stationary tubular guide extending down close to the surface of the turret and through which articles may pass by gravity, said guide provided with a cut-off means for the articles, and means for operating the cut-off in timed relation to the movement of the turret.

3. In a machine of the character stated, the combination of a reciprocating head, with a turret rotatable in a plane at right angles to the direction of reciprocation of the head, a plurality of female dies carried by the turret, a male plunger die and a hammer secured to and movable with the head and spaced at a greater distance apart than the dies on the turret, and magazine feeding means independent of the turret and spaced circumferentially to the turret intermediate of the plunger and hammer dies for feeding different articles to be united respectively to the female dies on the turret when adjusted to positions intermediate of the plunger die and hammer of the reciprocating head, and wherein further, means controlled by the reciprocating head are provided for intermittently rotating the turret with a step by step movement in the same direction, whereby the turret is stationary when the head is approaching it and rotating when the head is moving away from it.

4. In a machine of the character stated, the combination of a reciprocating head, with a turret rotatable in a plane at right angles to the direction of reciprocation of the head, a plurality of female dies carried by the turret, a male plunger die and a hammer secured to and movable with the head and spaced at a greater distance apart than the dies on the turret, and magazine feeding means independent of the turret and spaced circumferentially to the turret intermediate of the plunger and hammer dies for feeding different articles to be united respectively to the female dies on the turret when adjusted to positions intermediate of the plunger die and hammer of the reciprocating head, and wherein further, devices comprising spring actuated power means for positively rotating the turret, and spring compressing means actuated by the reciprocating head for putting the spring actuated power means in condition for action are provided for intermittently rotating the turret.

5. In a machine of the character stated, the combination of a reciprocating head, with a turret rotatable in a plane at right angles to the direction of reciprocation of the head, a plurality of female dies carried by the turret, a male plunger die and a hammer secured to and movable with the head and spaced at a greater distance apart than the dies on the turret, and magazine feeding means independent of the turret and spaced circumferentially to the turret intermediate of the plunger and hammer dies for feeding different articles to be united respectively to the female dies on the turret when adjusted to positions intermediate of the plunger die and hammer of the reciprocating head, and wherein further, devices comprising spring actuated power means for positively rotating the turret, and spring compressing means actuated by the reciprocating head for putting the spring actuated power means in condition for action are provided for intermittently rotating the turret, and wherein also locking means are provided for locking the turret against movement during the time the head is compressing the spring actuated power means.

6. In a machine of the character stated, the combination of a reciprocating head, with a turret rotatable in a plane at right angles to the direction of reciprocation of the head, a plurality of female dies carried by the turret, a male plunger die and a hammer secured to and movable with the head and spaced at a greater distance apart than the dies on the turret, and magazine feeding means independent of the turret and spaced circumferentially to the turret intermediate of the plunger and hammer dies for feeding different articles to be united respectively to the female dies on the turret when adjusted to positions intermediate of the plunger die and hammer of the reciprocating head, and wherein further, the female dies on the turret are each formed with a contracted waist diameter bounded on the top by an annular shoulder and slightly enlarged entrance diameter, and is associated with a reciprocable die in the lower portion of said female die to constitute an anvil within the waist diameter thereof, and means for forcing the reciprocable die upward through the female die for ejecting the finished article.

7. In a machine of the character stated, the combination of a reciprocating head, with a turret rotatable in a plane at right angles to the direction of reciprocation of the head, a plurality of female dies carried by the turret, a male plunger die and a hammer secured to and movable with the head and spaced at a greater distance apart than the dies on the turret, and magazine feeding means independent of the turret and spaced circumferentially to the turret intermediate of the plunger and hammer dies for feeding different articles to be united respectively to the female dies on the turret when adjusted to positions intermediate of the plunger die and hammer of the reciprocating head, and wherein further, means are provided for intermittently rotating the turret under the relatively fixed magazine feeding means for the articles to be acted upon by the dies, and the female dies in the turret are each formed with a contracted waist diameter bounded on the top with an annular shoulder and a slightly enlarged entrance diameter the depth of the latter being equal to the vertical depth of the article to be received from the magazine feeding means, whereby the turret and article in the die may move past the magazine feeding means and the turret constitute a cut-off therefor.

8. In a machine of the character stated, the combination of a reciprocating head, with a turret rotatable in a plane at right angles to the direction of reciprocation of the head, a plurality of female dies carried by the turret, a male plunger die and a hammer secured to and movable with the head and spaced at a greater distance apart than the dies on the turret, and magazine feeding means independent of the turret and spaced circumferentially to the turret intermediate of the plunger and hammer dies for feeding different articles to be united respectively to the female dies on the turret when adjusted to positions intermediate of the plunger die and hammer of the reciprocating head, and wherein further, the magazine feeding means includes a relatively stationary tubular guide extending down close to the surface of the turret and through which articles may pass by gravity, said guide provided with a cut-off means for the articles a little above the lower end of the tubular guide and the bottom of said guide formed with a transverse slot, and means for operating the cut-off in timed relation to the movement of the turret.

9. In a machine of the character stated, the combination of a bed frame having an upright stud, with a turret journaled on the stud and having dies movable about said stud, a reciprocating head guided upon said stud, power devices for reciprocating the head, means for intermittently rotating the turret in alternate times relation with the reciprocations of the head, separate operative means on the head in diametric relation for coacting with separate dies on the turret and the articles therein, and feeding means for delivering articles to the dies on the turret at times intermediate of the action of the operating means on the head.

10. The invention according to claim 9, wherein further, means are provided for holding the turret against rotation when the head is moving toward it.

11. The herein described method of securing solder to the end of a pin which consists in cupping the end of a mass of solder while held in suitable dies, thereafter driving a pin into the cupped end of the solder and forcing it through the dies whereby the cupped end of the solder is drawn into cylindrical form tightly upon and about the end of the pin, and finally releasing the pin and solder from the dies while in their permanently attached association.

In testimony of which invention, I hereunto set my hand.

ALBERT E. GIBSON.